US009423150B2

(12) United States Patent
Cooper (10) Patent No.: US 9,423,150 B2
(45) Date of Patent: Aug. 23, 2016

(54) STEAM COOKER (71) Applicant: AccuTemp Products, Inc., Fort Wayne, IN (US)

(72) Inventor: Lawrence E. Cooper, Fort Wayne, IN (US)

(73) Assignee: AccuTemp Products, Inc., Fort Wayne, IN (US)

(*) Notice: Subject to any disclaimer, the term of this patent is extended or adjusted under 35 U.S.C. 154(b) by 348 days.

(21) Appl. No.: 14/209,357

(22) Filed: Mar. 13, 2014

(65) Prior Publication Data

US 2014/0261384 A1    Sep. 18, 2014

Related U.S. Application Data (60) Provisional application No. 61/799,207, filed on Mar. 15, 2013.

(51) Int. Cl.
*F24H 1/00* (2006.01)
*A47J 27/16* (2006.01)
*A47J 27/04* (2006.01)

(52) U.S. Cl.
CPC ............. *F24H 1/0027* (2013.01); *A47J 27/16* (2013.01); *A47J 27/04* (2013.01); *F24H 1/00* (2013.01)

(58) Field of Classification Search
CPC ........ A47J 27/04; A47J 27/16; A47J 27/043; F24H 1/0027; H24H 1/00
USPC ..... 126/369, 20, 19 R, 21 R, 21 A; 431/352; 122/18.1
See application file for complete search history.

(56) References Cited

U.S. PATENT DOCUMENTS

| | | | |
|---|---|---|---|
| 2,599,153 A | 6/1952 | Beckett | |
| 2,900,019 A | 8/1959 | Beckett | |
| 3,003,440 A | 10/1961 | Riello | |
| 3,425,058 A | 1/1969 | Babington | |
| 3,797,473 A * | 3/1974 | Mutchler | F24C 15/322 126/21 A |
| 4,298,338 A | 11/1981 | Babington | |
| 4,397,292 A * | 8/1983 | Mitchell | F24B 7/00 126/61 |
| 4,991,545 A * | 2/1991 | Rabe | A47J 27/04 122/379 |
| 5,724,887 A * | 3/1998 | Hakvoort | A47J 37/129 126/392.1 |
| 6,805,112 B2 * | 10/2004 | Cole | F24C 15/322 126/21 A |
| 6,837,234 B2 * | 1/2005 | Rabas | A21B 3/04 126/21 A |

(Continued)

FOREIGN PATENT DOCUMENTS

EP    0 019 022    11/1980
GB    2388425 A  * 11/2003  .............. F24C 15/32

OTHER PUBLICATIONS

Afriso, Operating Instructions, Automatic Fuel Oil De-aerator, Type: Flow Control, Apr. 2008.

(Continued)

*Primary Examiner* — Gregory Huson
*Assistant Examiner* — Nikhil Mashruwala
(74) *Attorney, Agent, or Firm* — Faegre Baker Daniels LLP (57) ABSTRACT

A coupling device for attaching an external heat source to a high-throughput steam cooker enables the steam cooker to be used with a wide variety of heat sources and fuels. The coupling device includes a heat flow chamber that provides efficient, effective heat transfer from the heat source to a heat sink in thermal communication with the steam cooker, thereby facilitating steam generation in a steam cooker assembly. The heat source may be a liquid-fueled heat source to facilitate transport and storage of fuel to remote locations.

17 Claims, 4 Drawing Sheets

(56) References Cited

U.S. PATENT DOCUMENTS

| | | | |
|---|---|---|---|
| 7,229,278 B1 | 6/2007 | Newberry | |
| 2008/0105138 A1* | 5/2008 | Segato | F24C 15/327 99/447 |
| 2010/0000509 A1* | 1/2010 | Babington | A21B 1/26 126/19 R |
| 2013/0291740 A1* | 11/2013 | Seitz | A47J 27/16 99/342 |

OTHER PUBLICATIONS

Beckett Residential Burners, AFG Oil Burner, Product Sheet, Sep. 2010.

Beckett, "Alternative Fuels and Beckett Burners", Technical Bulletin, Jan. 2009.

Riello Burners, R-35 Series Oil Burners, accessed Sep. 13, 2011.

AccuTemp Products Company, Evolution Steamer documentation, Feb. 26, 2010.

\* cited by examiner

FIG_1

FIG_4

FIG_5

FIG. 6

STEAM COOKER

CROSS-REFERENCE TO RELATED APPLICATION

This application claims the benefit under 35 U.S.C. §119 (e) of U.S. Provisional Patent Application Ser. No. 61/799,207 filed Mar. 15, 2013 and entitled STEAM COOKER, the entire disclosure of which is hereby expressly incorporated herein by reference.

BACKGROUND

1. Technical Field

The present disclosure relates to a food preparation apparatus, and more particularly, to steam cooking devices that can draw energy from portable fuel.

2. Description of the Related Art

Steam cookers are widely used in commercial food service applications because they can rapidly cook or reheat large quantities of food while maintaining excellent food quality. In order to heat and/or cook food in a steam cooker, water is heated until it changes phase to become steam. The steam is then circulated through the cooker using a fan or other circulation mechanism, which allows the steam to contact the food and increase the temperature of the food.

In some commercial settings, this steam is sometimes generated using a heater powered by utility-grid energy sources, e.g., electricity or piped-in natural gas. These heaters may direct heat to a heat sink, which in turn transfers the heat to the water source. This heat transfer occurs by convection of the gases in the steam cooker, conduction through those gases, and radiation. Efficiently utilizing each of these heat transfer methods is desirable.

An improvement over the foregoing is desirable.

SUMMARY

The present disclosure provides a coupling device for attaching an external heat source to a high-throughput steam cooker, thereby enabling the steam cooker to be used with a wide variety of heat sources and fuels. The coupling device includes a heat flow chamber that provides efficient, effective heat transfer from the heat source to a heat sink in thermal communication with the steam cooker, thereby facilitating steam generation in a steam cooker assembly. The heat source may be a liquid-fueled heat source to facilitate transport and storage of fuel to remote locations.

In one form thereof, the present disclosure provides a steam cooking assembly comprising: a chamber having a vertical extent defining a longitudinal chamber axis, the chamber comprising: a lower wall defining a heat inlet; a plurality of interior surfaces cooperating to define a heating channel, the heating channel extending from the heat inlet to a flue, the flue vertically and laterally spaced from the heat inlet; and a heat exchanger positioned opposite the heat inlet and forming a top surface of the chamber; and an external heat source having a fuel conduit that is selectively affixable to the heat inlet of the chamber, the external heat source adapted to transmit heat into the chamber, the fuel conduit defining a longitudinal conduit axis laterally spaced from the longitudinal chamber axis such that the fuel conduit defines an off-center location with respect to the chamber, whereby hot gases discharged from the fuel conduit are directed across an undersurface of the heat exchanger by the heating channel.

In another form thereof, the present disclosure provides a steam cooking assembly comprising: a chamber having a vertical extent defining a longitudinal chamber axis, the chamber comprising: a lower wall defining a heat inlet; a plurality of interior surfaces cooperating to define a heating channel, the heating channel extending from the heat inlet to a flue, the flue vertically and laterally spaced from the heat inlet; and a heat exchanger positioned opposite the heat inlet and forming a top surface of the chamber; and an external heat source comprising: a fuel combustion unit; a liquid fuel reservoir in fluid communication with the fuel combustion unit; and a fuel conduit extending away from the fuel combustion unit, the fuel conduit selectively affixable to the heat inlet of the chamber and positioned to transmit heat from the fuel combustion unit to the chamber.

In yet another form thereof, the present disclosure provides a steam cooking assembly comprising: a chamber having a vertical extent defining a longitudinal chamber axis, the chamber comprising: a lower wall defining a heat inlet; a plurality of interior surfaces cooperating to define a heating channel, the heating channel extending from the heat inlet to a flue, the flue vertically and laterally spaced from the heat inlet; and a heat exchanger positioned opposite the heat inlet and forming a top surface of the chamber; a heat source bracket sized affixed to the lower wall; and an external heat source having a fuel conduit that is selectively affixable to the heat inlet of the chamber via the heat source bracket, the fuel conduit having an output end protruding past the heat inlet to define vertical heat transfer distance when the fuel conduit is affixed to the chamber, the vertical heat transfer distance equal to between 9.5 inches and 11.5 inches whereby the external heat source can burn a variety of liquid fuels while distributing heat evenly to the heat exchanger.

BRIEF DESCRIPTION OF THE DRAWINGS

The above-mentioned and other features of the disclosure, and the manner of attaining them, will become more apparent and will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

The present disclosure provides a coupling device for attaching an external, liquid-fueled heat source to a high-throughput steam cooker, thereby enabling the steam cooker to be used in remote locations (e.g., for military and/or humanitarian relief efforts). The coupling device includes a heat flow chamber which provides efficient, effective heat transfer from the heat source to a heat sink in thermal communication with the steam cooker, thereby facilitating steam generation in a steam cooker assembly.

Figure 4:
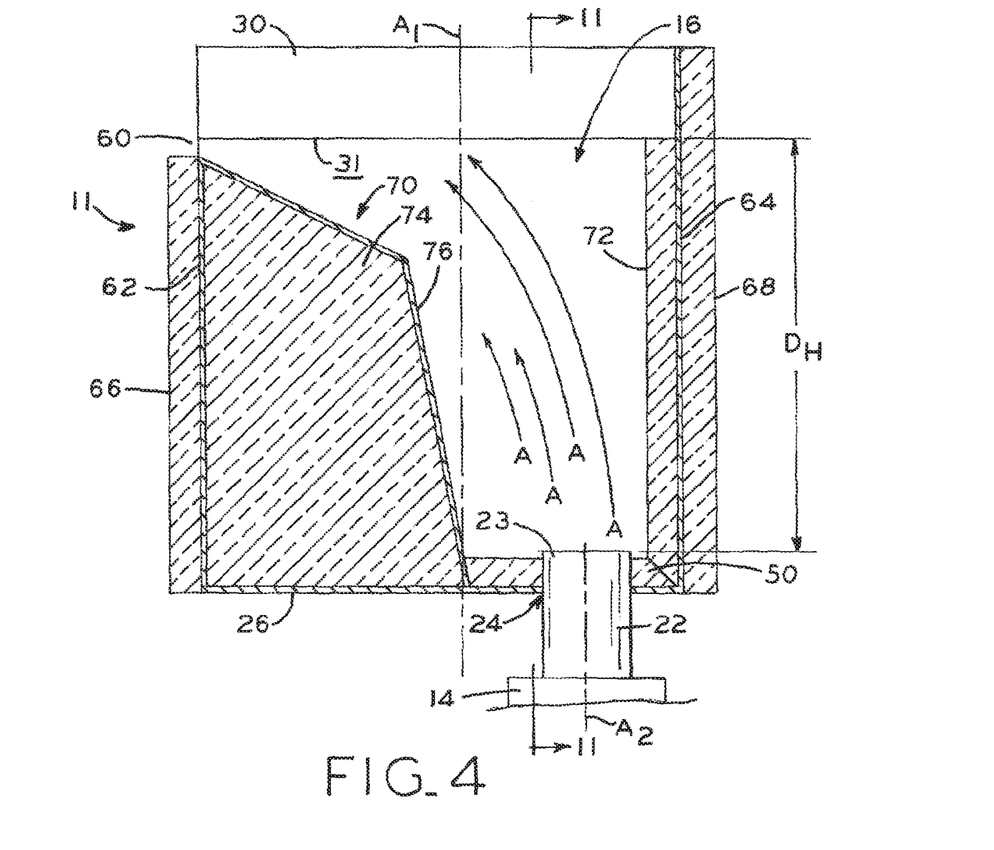
FIG. 4 is a side elevation, cross-sectional view of the heat flow chamber of FIG. 1, taken along line IV-IV of FIG. 2.

These improvements include positioning the heat source in an off-centered location relative to the heat flow chamber, utilizing conduction and convection heat-directing and radiation heat-deflecting structures to evenly distribute the heat that is transferred to the heat sink, and other features described in further detail below. For example, FIG. 4 shows a combustion/heat flow chamber 16 with a deflector structure 70 mounted therein, which cooperates with front interior insulation panel 72 to define heating channel A. Burner 14, which is positioned closer to the front than to the back of heat flow chamber 16, discharges heated combustion gases upwardly toward heat exchanger 30 and allows these hot gases to evenly deposit heat to steamer cooker 18 (FIG. 1).

1. Steam Cooker Assembly

Figure 1:
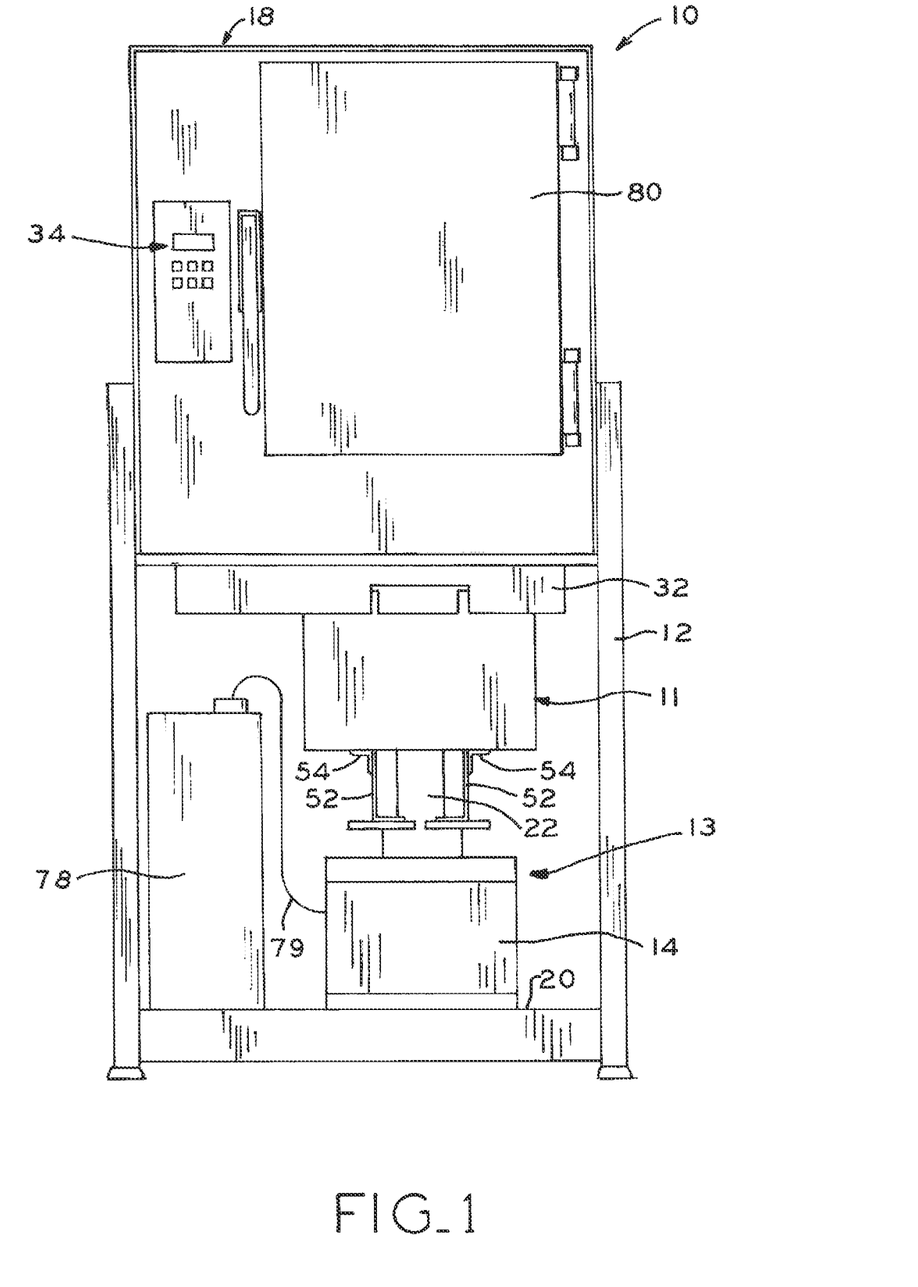
FIG. 1 is a front view of a heat flow chamber made in accordance with the present disclosure, shown in conjunction with a steam cooker assembly and an external heat source.

Referring now to FIG. 1, steam cooker assembly 10 is illustrated installed on carrier/chassis 12 and includes external heat source 13 and steam cooker 18 thermally coupled to one another by coupling assembly 11. As illustrated in FIG. 1 and described in further detail below, external heat source 13 includes burner 14, fuel reservoir 78 and fuel line 79. In the illustrated embodiment, burner 14 is positioned upon and supported by bottom platform 20 of carrier 12, though it is contemplated that burner 14 may be supported by any suitable surface, including the ground.

Figure 6:
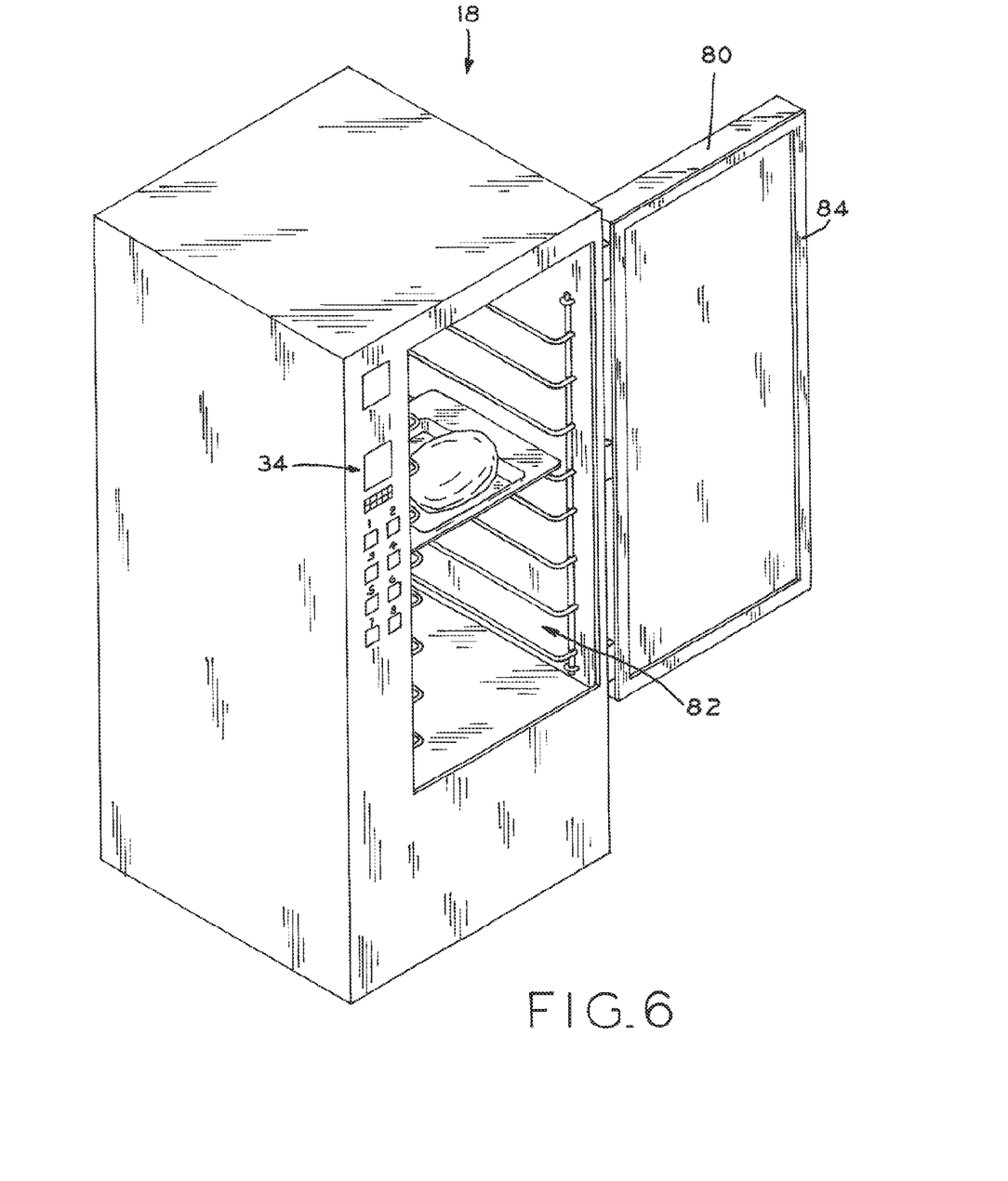
FIG. 6 is perspective view of a commercial food service steamer in accordance with the present disclosure.

FIG. 6 illustrates steamer 18 with door 80 open, revealing sealable cooking chamber 82 including a plurality of pan racks. Sealable cooking chamber 82 is in fluid communication with a water source, such as a water reservoir contained within steam cooker 18. When heated, this water source becomes a source of steam to provide for cooking of food items placed therein. External heat source 13 provides the energy to convert the liquid-state water into the steam, as shown in FIG. 1 and described in further detail below. Door 80 is pivotally connected to steamer 18 and includes seal 84 which cooperates with an outer surface of steamer 18 to hermetically seal sealable cooking chamber 82 during cooking of food items. The present invention may be utilized, e.g., with the steamers such as the Steam 'N' Hold™ and Evolution Steamers™ available from AccuTemp Products, Inc. of Fort Wayne, Ind. Such steamers are designed to create a cooking chamber having a temperature throughout cooking chamber 82 in the range of 100° F. to 212° F. (or atmospheric boiling point) and a relative humidity approaching 100%. Further, the cooking chambers of such steamers may be placed at positive or negative pressure.

Turning back to FIG. 1, external heat source 13 includes burner 14, which serves as a fuel combustion unit for converting liquid fuel into heat to power steam cooker 18 as further described below. Burner 14 is fluidly connected to a liquid fuel reservoir 78 (which may be a 5-gallon "jerry can" commonly used for small-scale fuel transport) via fuel line 79. As fuel is delivered from reservoir 78 to burner 14, such fuel is mixed with air at outlet 23 of conduit 22 (FIG. 2), which is a part of burner 14 and extends upwardly into coupling assembly 11 as shown. The fuel then mixes with air and is combusted, such that the resulting flame and hot combustion gases are discharged within heat flow chamber 16, as shown in FIG. 4 and further described below.

Figure 2:
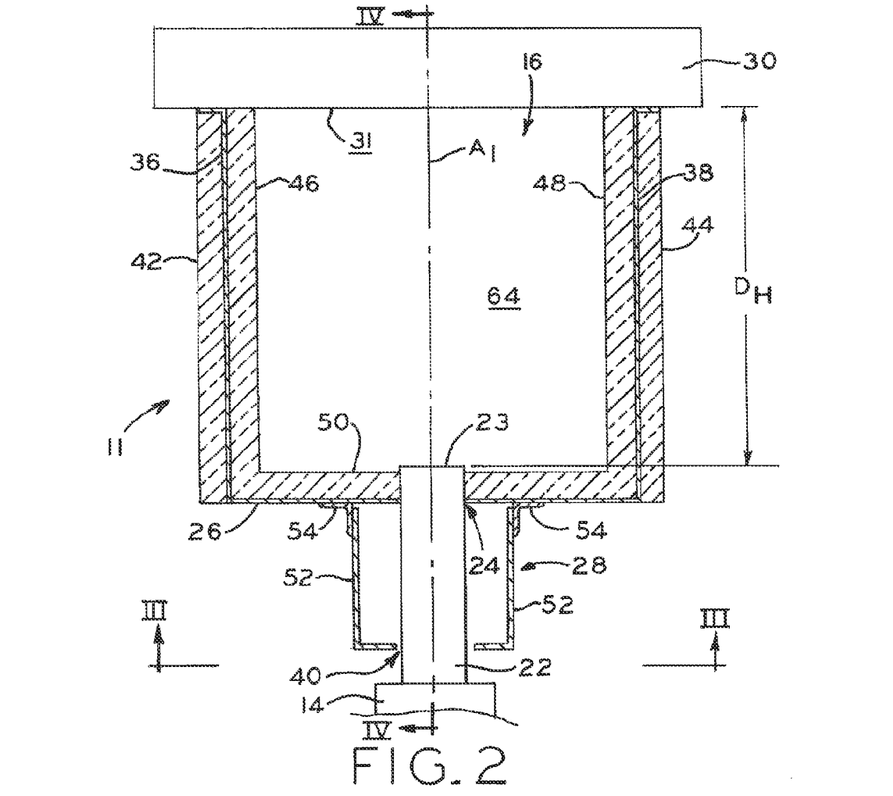
FIG. 2 is an elevation, cross-sectional view of the heat flow chamber of FIG. 1, taken along line II-II of FIG. 4.

Turning to FIG. 2, conduit 22 of burner 14 is selectively affixed within heat inlet 24 at a lower wall 26 in heat flow chamber 16 by bracket 28. In this configuration, fuel conduit 22 is positioned to discharge fuel from a fuel vaporization and/or delivery device of burner 14 to chamber 16 of coupling assembly 11, where the fuel combusts to deliver heat to steam cooker 18 as described below. Fuel conduit 22 defines longitudinal conduit axis $A_2$, which is laterally spaced from longitudinal axis $A_1$ of chamber 16 as viewed from the side view of FIG. 4, but centered with respect to longitudinal axis $A_1$ as viewed from the front or back as shown in FIG. 2. In this way, it may be said that fuel conduit 22 defines an "off-center" location with respect to chamber 16.

Output end 23 of fuel conduit 22 protrudes past heat inlet 24 and lower interior insulation 50 (further described below), and into combustion/heat flow chamber 16. Vertical heat transfer distance $D_H$ is defined between output end 23 and a lower surface 31 of heat exchanger 30 when fuel conduit 22 is affixed to coupling assembly 11 as described herein. In an exemplary embodiment, vertical heat transfer distance $D_H$ is between 9.5 inches and 11.5 inches, which yields the potential for external heat source 13 to output a variety of different heat temperatures and heat flow rates. More particularly, distance $D_H$ is sufficiently large to allow heat to distribute evenly over lower surface 31 of heat exchanger 30, while also being sufficiently small to ensure minimal heat loss through the sidewalls of coupling assembly 11 and maintain a compact, portable overall shape suitable for transport to, and use in, remote locations. In one particular exemplary embodiment, vertical heat transfer distance $D_H$ is 10 inches.

Vertical heat transfer distance $D_H$ and the overall structure of coupling assembly 11 cooperate to facilitate the use of a variety of liquid fuels in burner 14. In an exemplary embodiment, burner 14 uses fuel that is in a liquid phase at ambient temperatures and pressures. Liquid fuels are energy-dense and safely transportable (such as in reservoir 78 shown in FIG. 1) to remote locations in relatively large quantities. Some examples of exemplary liquid fuels useable for steam cooker assembly 10 include JP8 (i.e., military-grade diesel), commercial diesel, aviation fuels such as jet-A, biodiesel, gasoline, kerosene, white gas, and commercial heating oils. Exemplary burners 14 compatible with coupling assembly 11 that use liquid fuels include commercially available burners manufactured by: Carlin Combustion Technology, Inc. of East Longmeadow, Mass., USA; Becket Corporation of North Ridgeville, Ohio, USA; and Riello Burners of Hingham, Mass., USA.

However, it is contemplated that gaseous fuels may also be used as required or desired for certain applications. These fuels may include natural gas, propane, and butane, for example.

As noted above, lower surface 31 of heat sink/exchanger 30 forms the top surface of heat flow chamber 16, generally opposite heat inlet 24 (which is formed in the bottom surface of chamber 16). Hot gases discharged from fuel conduit 22 are directed across lower surface 31 of heat exchanger 30 by heating channel A, thereby imparting heat to heat exchanger as described in further detail below.

Heat exchanger 30 is disposed adjacent to and in thermal communication with a water source, such as a water reservoir inside cooking chamber 82 of steam cooker 18. Heat absorbed by heat exchanger 30 is transferred to the water in steam cooker 18, thereby creating steam inside cooking chamber 82 as noted above. In an exemplary embodiment, heat exchanger 30 has a plurality of circuitous fins that present a large cumulative surface area for maximized heat absorption. In one exemplary embodiment, steam cooker 18 is secured directly to heat exchanger 30. In a further exemplary embodiment, the exterior of casing steam cooker 18 is constructed from T304 stainless steel, however several other materials may be utilized.

Turning again to FIG. 1, carrier 12 is illustrated. Carrier 12 holds and supports the entire weight of steam cooker assembly 10 and facilitates the movement and storage of steam cooker assembly 10 as a single structure for convenience. Either casters or feet can be positioned along the bottom of carrier 12 depending on whether steam cooker assembly 10 needs to be easily movable or stored in one location long-term.

In general, food is cooked within cooking chamber 82 of steam cooker 18 by heating water stored in the condensate tray positioned above drain enclosure 32, which in turn creates steam. This steam is distributed using steam distribution conduits (not shown) distributed along the top, bottom, and sides of steam cooker 18 to evenly heat the food by spreading the steam around. The heating process that creates the steam, as will be described in further detail below, uses energy from burner 14, which creates hot combustion gases by burning fuel, such as liquid fuel. The heat of combustion, as well as the hot gases produced by the combustion process, is discharged into combustion/heat flow chamber 16 and vaporized fuel flows into chamber from fuel conduit 22. This heat flows through chamber 16 toward heat exchanger 30, where the heat from heat flow chamber 16 is transferred to heat exchanger 30 and into steam cooker 18.

Heat transfer from heat exchanger 30 into cooking chamber 82 occurs by convection of surrounding gases, conduction through gases and solid materials of steam cooker assembly 10, and radiation. Heat exchanger 30 heats the water in cooking chamber 82 to generate steam, which is then distributed evenly throughout steam cooker 18. In the present embodiment, pictured in FIG. 1, an operator of steam cooker 18 can control this heating and cooking process by using controller 34 to input, among other things, the heating or cooking temperature, the amount of time the food is to be heated, and other operational parameters.

Turning to FIG. 2, a cross-sectional view of coupling assembly 11 is illustrated, looking toward the front wall of combustion/heat flow chamber 16 from the inside of same. Left, right, and lower walls 36, 38, and 26 of heat flow chamber 16 are constructed of a durable, integrally formed shell material, such as T304 stainless steel panels welded to one another. Left and right blanket-type exterior insulations panels 42 and 44 cover the exteriors of left and right walls 36 and 38, respectively to provide a thermal barrier to transfer of heat from chamber 16 to the ambient air. In an exemplary embodiment, insulation panels 42, 44 are made of a lightweight, flexible, and needled material made from spun ceramic fibers. In one exemplary embodiment, insulation panels 42, 44 are 1.5-inch thick blanket-type Superwool® material, commercially available from the Morgan Thermal Ceramics division of the Morgan Crucible Company located in Berkshire, United Kingdom. This material may have a thermal conductivity minimum of 0.42 BTU-in/hr-ft$^2$-degree F.

Coupling assembly 11 further includes insulation inside chamber 16, including left, right, and lower interior insulation panels 46, 48 and 50 covering the interior surfaces of left, right, and lower walls 36, 38 and 26, respectively. In an exemplary embodiment, insulation panels 46, 48 and 50 are formed from a board insulation material that is more rigid than the blanket insulation used for panels 42, 44, and is suitable for exposure to the relatively high temperatures that may be found in the interior of heat flow chamber 16 during operation of steam cooker assembly 10. In an exemplary embodiment, each of insulation panels 42, 44, 46, 48 and 50 are about 1" thick, though it is contemplated that other thicknesses may be utilized as required or desired for a particular application. In a further exemplary embodiment, insulation panels 46, 48 and 50 are 1.0" thick board-type Superwool® material, commercially available from the Morgan Thermal Ceramics division of the Morgan Crucible Company located in Berkshire, United Kingdom. This material may have a thermal conductivity minimum of 0.42 BTU-in/hr-ft$^2$-degree F.

Figure 3:
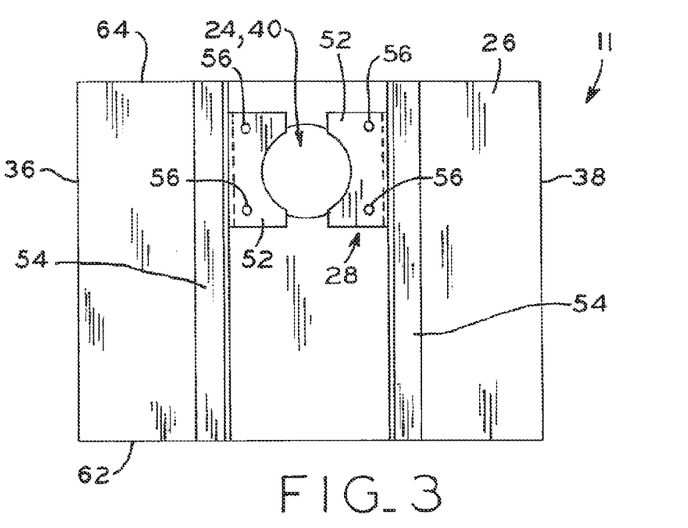
FIG. 3 is a bottom plan view of the heat flow chamber of FIG. 1, taken along line of FIG. 2.

Fuel conduit 22 is directed through heat inlet 24 in lower wall 26 and guided and held within heat flow chamber 16 using bracket 28, as best seen in FIGS. 2 and 3 and noted above. Bracket 28 includes two bracket halves 52, which cooperate to define bracket aperture 40 which is aligned with heat inlet 24. To affix bracket 28 to the undersurface of lower wall 26, runners 54 are affixed to lower wall 26 (such as by fasteners or welding, for example) and laterally spaced apart from one another by an appropriate distance.

Figure 5:
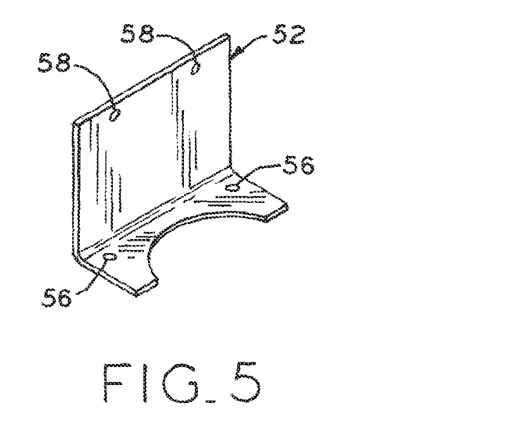
FIG. 5 is a perspective view of a portion of a mounting bracket made in accordance with the present disclosure.

In the illustrated embodiment of FIG. 3, runners 54 span from the front wall 64 to rear wall 62 along the exterior surface of lower wall 26 of combustion/heat flow chamber 16. This arrangement facilitates potential attachment points for of bracket halves 52 at different front-to-back locations to facilitate adaptation of coupling assembly 11 to various potential burners 14. Each bracket half 52 has two apertures 56 to accommodate fasteners (not shown) that can couple each bracket half 52 to burner 14 and two apertures 58 (FIG. 5) to accommodate fasteners that couple bracket halves 52 to runners 54. Using these fasteners, bracket halves 52 can be removed and replaced at different locations along runners 54 depending on the chosen location of heat inlet 24 in lower wall 26. In the exemplary illustrated embodiment, bracket halves 52 are positioned off-centered, biased toward front wall 64. As will be described in further detail below, this off-center positioning benefits the heat transfer from heat flow chamber 16 into steam cooker 18.

Referring back to FIG. 4, a cross-sectional view of the interior of coupling assembly 11 is illustrated between front and back walls 64, 62 to show the side-to-side profile of heat flow chamber 16. Flue 60 is positioned at the rear and top of combustion/heat flow chamber 16, i.e., adjacent lower surface 31 of heat exchanger 30 and rear wall 62. Flue 60 operates to exhaust combustion gasses from chamber 16. Burner 14 is positioned opposite flue 60, i.e., near the front and bottom of chamber 16.

Rear, front, and lower walls 62, 64, and 26 of heat flow chamber 16, are respectively constructed of a relatively thin rigid material, such as T304 stainless steel as noted above. Left and right walls 36, 38 (FIG. 2) may be made of a similar material. Left, right, rear and front walls, 36, 38, 62 and 64, are covered by insulation panels 42, 44, 66 and 68 respectively along their outer surfaces, as noted above, with front wall 64 and front blanket insulation panel 68 extending past the uppermost point of heat flow chamber 16 to cover the front exterior of heat exchanger 30 as illustrated.

Channel A is defined, front-to-back, between deflector structure 70 and front interior insulation panel 72 within chamber 16. Deflector structure 70 includes rear interior insulation panel 74 contained within and covered by deflector plate 76 along the back section of chamber 16. In an exemplary embodiment, rear interior insulation panel 74 is formed from 1.5-inch thick blanket-type Superwool® material, commercially available from the Morgan Thermal Ceramics division of the Morgan Crucible Company located in Berkshire, United Kingdom, which has a thermal conductivity minimum of 0.42 BTU-in/hr-ft$^2$-degree F. as noted above. Deflector plate 76 may be a thin layer of T309 stainless steel, in one exemplary embodiment, which is well-suited for service inside the high-temperature environment of chamber 16. An upper end of deflector plate 76 forms the lower surface of flue 60, and plate 76 extends downwardly at a gradually angled slope as shown. Plate 76 turns to a sharper downward angle, and maintains this trajectory to a lower end at lower wall 26 near longitudinal axis $A_1$. Thus, deflector plate 76 defines an angled reflective surface that spans the width between the left and right interior insulation panels 46, 48 (FIG. 2) of heat flow chamber 16.

Front interior insulation panel 72 is positioned across from deflector structure 70 on the opposite side of heat inlet 24. That is to say, deflector structure 70 is positioned rearward relative to heat inlet 24, while front interior insulation panel 72 is positioned forward relative to heat inlet 24. Thus, deflector structure 70, with stainless steel deflector plate 76, defines the rear surface of channel A, and front interior insulation panel 72, made of ceramic, defines the front surface of channel A. Side surfaces of channel A are provided by the exposed portions of left and right insulation panels 46, 48.

Channel A provides efficient and even heat transfer between heat exchanger 30 and deflector plate 76. After fuel is routed into chamber 16 via fuel conduit 22 of within burner 14, the resulting combustion and associated hot gases travel upward through fuel conduit 22 into heat flow chamber 16 toward heat exchanger 30, as described above. Because this combustion gas is hot, its density is relatively lower than the surrounding ambient air such that the combustion gases are lighter and therefore tend to rise through channel A upon discharging from outlet 23 of fuel conduit 22. As noted above, channel A is bounded below and on its sides by materials that resist heat transfer by both conduction and convection (e.g., insulation panels 42, 44, 46, 48, 66, 68, and 74). This prevents heat energy of the combustion gases from dissipating as the heat traverses channel A, thereby increasing the heat transfer to heat exchanger 30 and into steam cooker 18. After the gas has traveled upward to heat exchanger 30, then rearward along lower surface 31 to transfer as much heat to steam cooker 18 as possible, the remaining gases are expelled from chamber 16 through flue 60. The shape of deflector structure 70 serves to encourage the upward travel of the hot gases at a lower portion thereof (where the angle is steep) and to encourage the horizontal traverse of the hot gases across lower surface 31 to transfer heat therefrom.

In addition to this channeling function, deflector structure 70 works to deflect radiation heat by utilizing its stainless steel surface to reflect the radiation heat upward, thereby more evenly spreading the radiation heat about heat exchanger 30. The stainless steel acts as a radiant/reflective barrier that inhibits radiation heat transfer into deflector structure 70, so that instead, the radiation heat moves toward heat exchanger 30. The shape and positioning of deflector structure 70 help increase the heat transferred across the entire surface of heat exchanger 30, with the steep-angled portion of plate 76 angled only slightly upward toward the forward portion of heat exchanger 30 (where the fresh combustion gases discharging from fuel conduit 22 are relatively hotter and therefore more energetic), and angled substantially upward toward the rear portion of heat exchanger 30 (where the cooled combustion gases spaced from fuel conduit 22 are relatively less hot and therefore less energetic).

Gas is vaporized and discharged from burner 14 and rises into combustion chamber 16 through inlet 24 via fuel conduit 22, as described above. The gas is combusted within combustion chamber 16, near outlet 23 of fuel conduit 22. Inlet 24 is positioned off-centered and nearer the front of chamber 16 so that the resulting heated gases can travel upward along channel A. As the heated gas travels upward, the heat loss via transfer through conduction and convection from the gas is minimized because of rear interior insulation panel 74 contained within deflector structure 70 and front interior insulation panel 72. Further, the radiation heat along heat exchanger 30 is maximized by deflector plate 76 that directs the radiation heat toward heat exchanger 30. Therefore, heat transferred into cooking chamber 82 and steam cooker 18 via heat exchanger 30 through conduction, convection, and radiation heat transfer is increased by the structures defining channel A.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A steam cooking assembly comprising:
    a chamber having a vertical extent defining a longitudinal chamber axis, said chamber comprising:
        a lower wall defining a heat inlet;
        a plurality of interior surfaces cooperating to define a heating channel, said heating channel extending from said heat inlet to a flue, said flue vertically and laterally spaced from said heat inlet;
        a heat exchanger positioned opposite said heat inlet and forming a top surface of said chamber; and
        a deflector plate extending from a rear surface of said plurality of interior surfaces at said flue to said lower wall, said deflector plate extending downwardly from said flue to define a first angled slope, and said deflector plate extending upwardly from said lower wall to define a second angled slope steeper than said first angled slope;
    an external heat source having a fuel conduit that is selectively affixable to said heat inlet of said chamber, said external heat source adapted to transmit heat into said chamber, said fuel conduit defining a longitudinal conduit axis laterally spaced from said longitudinal chamber axis such that said fuel conduit defines an off-center location with respect to said chamber, whereby hot gases discharged from said fuel conduit are directed across an undersurface of said heat exchanger by said heating channel; and a steam cooker having a selectively sealed cooking chamber, said steam cooker positioned to receive heat from said external heat source via said heat exchanger.

2. The steam cooking assembly of claim 1, wherein said external heat source comprises:

a fuel combustion unit;

a liquid fuel reservoir in fluid communication with said fuel combustion unit, said fuel conduit extending away from said fuel combustion unit.

3. The steam cooking assembly of claim 1, wherein said fuel conduit has an output end protruding past said heat inlet to define a vertical heat transfer distance when said fuel conduit is affixed to said chamber, said vertical heat transfer distance equal to between 9.5 inches and 11.5 inches whereby said external heat source can burn a variety of liquid fuels while distributing heat evenly to said heat exchanger.

4. The steam cooking assembly of claim 1, wherein said deflector plate extends to said lower wall at said longitudinal chamber axis.

5. The steam cooking assembly of claim 1, further comprising a heat source bracket sized to couple said external heat source to said lower wall.

6. The steam cooking assembly of claim 1, further comprising a plurality of insulation panels disposed around a periphery of said chamber.

7. The steam cooking assembly of claim 6, wherein said chamber is constructed of a stainless steel shell material.

8. The steam cooking assembly of claim 2, wherein said liquid fuel reservoir contains a liquid fuel in a liquid phase at ambient temperatures and pressures.

9. The steam cooking assembly of claim 8, wherein said liquid fuel comprising at least one of JP8 type military-grade diesel, commercial diesel, jet-A type aviation fuel, kerosene and commercial heating oil.

10. The steam cooking assembly of claim 3, wherein said vertical heat transfer distance is 10 inches.

11. The steam cooking assembly of claim 3, wherein said vertical heat transfer distance is defined between the output end of the fuel conduit and a lower surface of the heat exchanger.

12. The steam cooking assembly of claim 1, further comprising a carrier which holds and supports the entire weight of steam cooker assembly.

13. The steam cooking assembly of claim 12, wherein the carrier comprises casters positioned along the bottom thereof such that the carrier is easily movable.

14. The steam cooking assembly of claim 12, wherein the carrier comprises feet positioned along the bottom thereof.

15. The steam cooking assembly of claim 1, wherein the steam cooker comprises a condensate tray positioned to receive heat from the heat exchanger for the creation of steam.

16. The steam cooking assembly of claim 1, further comprising a controller having a user input, the user input cooperating with the controller to control at least one of the cooking temperature and the amount of time the chamber is to be heated.

17. The steam cooking assembly of claim 1, wherein the plurality of insulation panels have a thermal conductivity up to 0.42 BTU-in/hr-ft$^2$-degree F.

* * * * *